(12) United States Patent
Restrepo et al.

(10) Patent No.: US 7,110,864 B2
(45) Date of Patent: Sep. 19, 2006

(54) SYSTEMS, DEVICES, AND METHODS FOR DETECTING ARCS

(75) Inventors: Carlos Restrepo, Atlanta, GA (US); Jeremy Henson, Raleigh, NC (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 11/074,331

(22) Filed: Mar. 7, 2005

(65) Prior Publication Data

US 2005/0203672 A1   Sep. 15, 2005

Related U.S. Application Data

(60) Provisional application No. 60/551,305, filed on Mar. 8, 2004.

(51) Int. Cl.
*G01R 31/00* (2006.01)
*G01R 31/08* (2006.01)

(52) U.S. Cl. ......................... 700/293; 324/522; 324/536

(58) Field of Classification Search ................ 700/292, 700/293; 324/520, 522, 536, 613; 361/42
See application file for complete search history.

(56) References Cited

U.S. PATENT DOCUMENTS 5,432,455 A *   7/1995  Blades ........................ 324/536
5,434,509 A *   7/1995  Blades ........................ 324/536
5,729,145 A *   3/1998  Blades ........................ 324/522
5,839,092 A    11/1998  Erger et al.
6,456,471 B1 *  9/2002  Haun et al. ..................... 361/42
6,667,691 B1   12/2003  Sapir
2002/0033701 A1  3/2002  Macbeth et al.

FOREIGN PATENT DOCUMENTS

EP   1322016 A   6/2003

OTHER PUBLICATIONS

International Search Report, Date Completed: Jun. 16, 2005 for International App. No. PCT/US2005/007471.

\* cited by examiner

*Primary Examiner*—Leo Picard
*Assistant Examiner*—Charles Kasenge

(57) ABSTRACT

Certain exemplary embodiments comprise method, the method comprising a plurality of activities comprising: for each of a plurality of potential arcing events associated with an alternating current: sensing the potential arcing event; identifying an amplitude-duration pair associated with the potential arcing event; assessing the plurality of amplitude-duration pairs; and determining if the plurality of potential arcing events corresponds to an arcing condition.

22 Claims, 14 Drawing Sheets

```
Initialize Variables startCounter = 1;         % Counter used to store the time an event has been initially detected
timeStamp = 1;            % Variable used to record the time an arc fault has been detected.
score = 0;                % Array used to record the score value of each event found.
maxScore = 8;             % A score >= 8 will determine an arc fault.

scoreIncrement = 0;       % Variable containing the score value of each event.
diffThreshold = 20;       % Value to differentiate the presence of a steep rise of the signal
T1 = 30;                  % Different Threshold levels used to assign different score to different amperages.
T2 = 50;
T3 = 75;                  % Refers to ampThreshold in the matlab code type.m
T4 = 100;
T5 = 150;
T5 = 200;
IC1 = 0.5;                %Different Score Increments used based on the amplitude of the arc fault event detected
IC2 = 1.0;
IC3 = 2.0;
IC3 = 3.0;
IC4 = 4.0;
IC5 = 8.0;

eventFlag1 = 0;           % Flag used to route the flow of the event detection process.
eventFlag2 = 0;           % Flag used to route the detection process once portion of the event has been detected.
scoreCountFlag = 0;       % Flag used to prevent the algorithm from counting an event more than once.
decayFlag1 = 0;           % Flag used to log the initial time stamp when the decay analysis is starting
maxValue = 0;             % Maximum Amperage Amplitude found for that event.
maxIndex = 0;             % Location in time of that Maximum value.
maxList = [];             % Array that will store all max values found.
maxListIndex = [];        %Array that will store all max values location in time.
```

FIG.7C

SYSTEMS, DEVICES, AND METHODS FOR DETECTING ARCS

CROSS-REFERENCES TO RELATED APPLICATIONS

This application claims priority to, and incorporates by reference herein in its entirety, pending U.S. Provisional Patent Application Ser. No. 60/551,305, filed 8 Mar. 2004.

BACKGROUND

U.S. patent application Ser. No. 6,459,273 (Dollar), which is incorporated by reference herein in its entirety, allegedly recites a "sputtering arc fault detector (10) for a system having an electrical conductor (14) carrying current to a load. The sputtering arc fault detector includes a current monitor (64) coupled to the conductor for generating a variable signal responsive to behavior of the current in the conductor. A level detector (58) is coupled to the monitor and generates a first pulse when the variable signal exceeds a first level. A step detector (62) is coupled to the monitor and is responsive to rapid step increases of the variable signal. The step detector generates a second pulse when the variable signal exceeds a second level. An arc verifier (48), which is coupled to the level detector and the step detector, combines the first and second pulses, and generates a fault signal when the combined pulses exceed a third level." See Abstract.

U.S. patent application Ser. No. 6,667,691 (Sapir), which is incorporated by reference herein in its entirety, allegedly recites a "method for the early detection of faults in an electric supply system, comprising the steps of continuously checking the existence of RF transients on the electric supply system line, transforming detected transients whose amplitude is above a predetermined level, into a sequence of pulses, analyzing the temporal spacing between pulses to identify those which are due to dimmers, and disregarding them, identifying short-noisy states structures in said sequence, states whose duration is shorter than a period T-ARC, determining short-noisy states where the current amplitudes before and after said states are different, and disregarding these states considered to be caused by normal switching operations, regarding each of the remaining short-noisy states as a faulty event and accumulating such events in a first register, identifying separately long-noisy states in said sequence, states whose duration is longer than a period T-ARC, ascribing a number of arcing events to each long-noisy state proportional to its duration, and accumulating these numbers in a second register; and summing the values in said first and second registers, and if the sum exceeds a predetermined value N-ALARM, within a predetermined period, activating an alarm and/or a current breaker." See Abstract.

U.S. patent application Ser. No. 6,556,397 (Kim), which is incorporated by reference herein in its entirety, allegedly recites a "device for detecting arc fault which distinguishes harmful arc from the signal generated by operation of a dimmer and start of electronic devices. Signals outputted from a current transformer is attenuated by a resistor which is coupled in parallel to the current transformer. By the attenuation of the resistor, the signal generated by the operation of a dimmer is not determined to be arc in arc determining part. Harmful arc and the signal generated by the start of the electronic device are distinguished by integrating both signals. As the harmful arc lasts for a long time, large signals are integrated in an integrator while the signal generated by the start of electronic device does not last for a long time." See Abstract.

U.S. patent application Ser. No. 5,835,321 (Elms), which is incorporated by reference herein in its entirety, allegedly recites that "Arcing-faults in an electric power distribution system are detected by a circuit which includes a band-pass filter generating a low frequency bandwidth limited arcing current signal having a bandwidth above the measurable harmonics of the ac current but below the frequency band of power line communications systems, about 3 KHz to 20 KHz and preferably about 6 KHz to 12 KHz. For each cycle of the ac current that this low frequency bandwidth limited arcing current exceeds a threshold, preferably related to the amplitude of the ac current, for a selected duration of the cycle, a fixed pulse is generated. If a time attenuated accumulation of these fixed pulses reaches a selected level representative of a number of closely spaced cycles in which the arcing current has been detected for the selected duration, an arc indicative signal is output. Preferably, the value of the time attenuated accumulation of pulses at which the arc indicative signal is generated is variable so that fewer pulses are needed to generate the output as the amplitude of the ac current increases." See Abstract.

SUMMARY

Certain exemplary embodiments comprise method, the method comprising a plurality of activities comprising: for each of a plurality of potential arcing events associated with an alternating current: sensing the potential arcing event; identifying an amplitude-duration pair associated with the potential arcing event; assessing the plurality of amplitude-duration pairs; and determining if the plurality of potential arcing events corresponds to an arcing condition.

BRIEF DESCRIPTION OF THE DRAWINGS

A wide variety of potential embodiments will be more readily understood through the following detailed description of certain exemplary embodiments, with reference to the accompanying exemplary drawings in which.

DEFINITIONS

Figure 1:
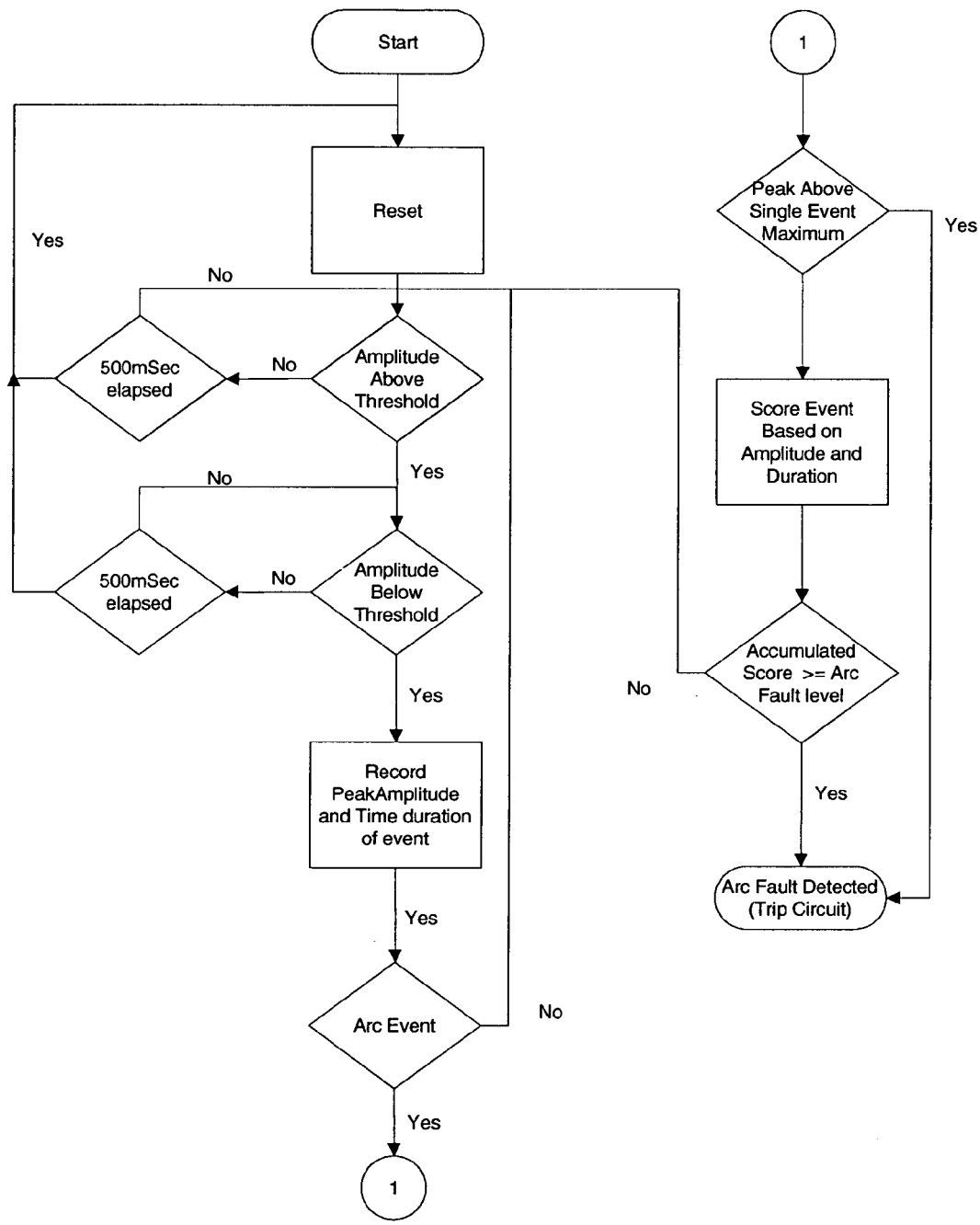
FIG. 1 is a flowchart of an exemplary embodiment of a method 1000.

When the following terms are used herein, the accompanying definitions apply:

acquire—to obtain and/or receive.

activity—an action, act, step, and/or process or portion thereof.

actuate—to put into motion or action; activate.

adapted to—made suitable or fit for a specific use or situation.

alternating current—an electric current that reverses direction in a circuit at regular intervals.

amplitude—a magnitude of a variable.

amplitude-duration pair—a set comprising an amplitude and a duration.

analyze—to consider in detail and/or subject to an analysis in order to discover essential features or meaning.

apparatus—an appliance or device for a particular purpose arc fault—a discharge of electricity between two or more conductors, the discharge associated with at least a predetermined voltage, current, and/or power level.

arcing condition—a set of occurrences evidencing actual arcing.

arcing event—an occurrence evidencing potential arcing.

armature—a part of an electromagnetic device that moves.

assess—to determine the value, significance, or extent of.

associated—related to and/or accompanying.

biased—urged in a direction.

can—is capable of, in at least some embodiments.

circuit—a closed path followed or capable of being followed by an electric current.

circuit breaker—a device adapted to automatically open an alternating current electrical circuit.

comprising—including but not limited to.

criterion—a standard, rule, or test on which a judgment or decision can be based; a basis for comparison; a reference point against which other things can be evaluated.

current overload—a flow of current above a predetermined value.

data—distinct pieces of information, usually formatted in a special or predetermined way and/or organized to express concepts.

define—to establish the outline, form, or structure of.

determine—to establish or ascertain definitely, as after consideration, investigation, or calculation.

digitize—to put in a digital form.

discriminate—to distinguish.

duration—a measure of a period over which something occurs and/or exists.

electronic trip device—an apparatus adapted to automatically open an electrical circuit upon detection of a predetermined electrical phenomena, such as a ground fault or an arc fault.

event—an occurrence.

hazardous—marked by danger, peril, and/or risk.

high frequency condition—a set of occurrences characterized by a frequency above a predetermined value.

identify—to recognize or detect.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

in-rush condition—a set of occurrences characterized by an amplitude below a predetermined value.

instructions—directions adapted to perform a particular operation or function.

interrupt—to make a break in; to cease current flow through.

machine readable medium—a physical structure from which a machine can obtain data and/or information. Examples include a memory, punch cards, etc.

may—is allowed to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

method—a process, procedure, and/or collection of related activities for accomplishing something.

network—a communicatively coupled plurality of nodes.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-arcing condition—a set of occurrences not evidencing actual arcing.

notification—the act or an instance of informing or making known.

open—to interrupt.

peak—a maximum and/or minimum associated with a predetermined time period.

plurality—the state of being plural and/or more than one.

potential—existing in possibility.

predetermined—established in advance.

processor—a device, an embodiment of, and/or a set of machine-readable instructions, for performing one or more predetermined tasks. A processor can comprise hardware, firmware, and/or software. A processor can utilize mechanical, pneumatic, hydraulic, electrical, magnetic, optical, informational, chemical, and/or biological principles, mechanisms, signals, and/or inputs to perform the task(s). In certain embodiments, a processor can act upon information by manipulating, analyzing, modifying, and/or converting it, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium TV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

provide—to furnish, supply, and/or make available.

sample—a portion, piece, or segment that is representative of a whole.

score—a numerical value resulting from an evaluation with respect to a predetermined criterion.

sense—to detect or perceive automatically.

sensor—a device adapted to sense.

set—a related plurality.

signal—a fluctuating electric quantity, such as voltage, current, or electric field strength, whose variations represent coded information.

store—to place, hold, and/or retain data, typically in a memory.

substantially—to a great extent or degree.

sum—to add.

system—a collection of mechanisms, devices, data, and/or instructions, the collection designed to perform one or more specific functions.

treat—to act or behave in a specified manner toward.

trip—to automatically interrupt current flow in an electrical circuit.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

voltage spike—a voltage above a predetermined value.

DETAILED DESCRIPTION

Certain exemplary embodiments can accurately discriminate arcing and/or non-arcing conditions in alternating current (AC) power systems and/or can be embodied in Arc Fault Circuit Interrupters (AFCI). Arc detection can be based on an individual arc event amplitude-time relationship and/or the accumulation of multiple time-related events. Arcing conditions in AC power systems can be distinguished from non-arcing conditions through the measurement of the peak amplitude and/or time duration of the AC current waveform of discrete arc events and an event amplitude-based significance determination scheme to accumulate a sufficient sequence of time-related events to determine if arcing exists. Certain exemplary embodiments can be implemented via, for example, instructions implemented by and/or embodied in one or more state machines, microprocessors, field programmable gate arrays (FPGA's), and/or application specific integrate circuits (ASIC's), etc.

Certain exemplary embodiments can utilize a mixed-signal microprocessor with Analog-to-Digital conversion (A/D) capabilities. The microprocessor A/D input can be driven by a variable signal that represents the AC current waveform of the AC power system. This signal can be continuously digitized and/or processed by one or more of the algorithms described herein. Over time this algorithmic analysis of the input signal can distinguish arcing and/or non-arcing conditions.

FIG. 1 is a flowchart of an exemplary embodiment of a simplified detection algorithm and/or method 1000.

Discrete Arc Event Amplitude and Duration Discrimination

A potential arc event can be defined as follows: starting when the measured current exceeds a predetermined value and ends when the measured current returns to a level below a predetermined level. The peak amplitude of the current during the event and the time between the defined start and end points can be measured and/or recorded. These two parameters, i.e., the peak amplitude and the duration of the event, can be used together to determine if the event is an arcing or non-arcing event and/or represents an arcing or non-arcing condition.

In certain exemplary embodiments, an arc event can be characterized by any of the amplitude-duration pairs shown in the following Table 1:

TABLE 1

| Event Peak Amplitude (amps) | Event Duration (milliseconds) (time while current >20 amps) |
| --- | --- |
| 30–40 | 1.6–2.2 |
| 40–50 | 1.6–3.8 |
| >50 | 1.6–4.8 |

Amplitude-Based Event Significance Assignment

If an event is determined to be a potential arcing event, then it can be assigned a significance score value based on the event's amplitude. In general, and with certain exceptions, a higher amplitude can result in a higher score.

In certain exemplary embodiments, an arcing condition can be recognized, discriminated, detected, and/or declared from a cumulative score of at least 16, based on a history of 8 events occurring within 500 milliseconds. The individual events can be scored as shown in the following Table 2:

TABLE 2

| Event Peak Amplitude (amps) | Significance Score |
| --- | --- |
| 30–40 | 1 |
| 40–60 | 2 |
| 60–80 | 4 |
| 80–120 | 5 |
| 120–180 | 6 |

Exceptions to Table 2 can be as follows:
any single arc event greater than 180 amps can result in an arcing condition being recognized, discriminated, detected, and/or declared; and
if the $1^{st}$ event in the history buffer has a peak of 60–120 amps it can be scored as a 2 so that certain in-rush conditions are not falsely characterized as arcing.

In certain exemplary embodiments, the scores of Table 2 can be scaled, as can the criteria for determining an arcing condition. In certain exemplary embodiments, the scores can be averaged and/or weighted. In certain exemplary embodiments, a higher amplitude can result in a lower score, such that relatively low cumulative score and/or average score can be suggestive of an arcing condition.

Multiple Event Accumulation and Analysis

Usually, multiple arcing events can adequately discriminate arcing and/or non-arcing conditions. The accumulation of the separate events' significance scores can be used to determine if hazardous arcing conditions exist that suggest, urge, and/or require circuit interruption. Additionally, multi-event analysis algorithms can be utilized to further discriminate arcing and non-arcing conditions. This can include event-to-event decay analysis.

Figure 2:
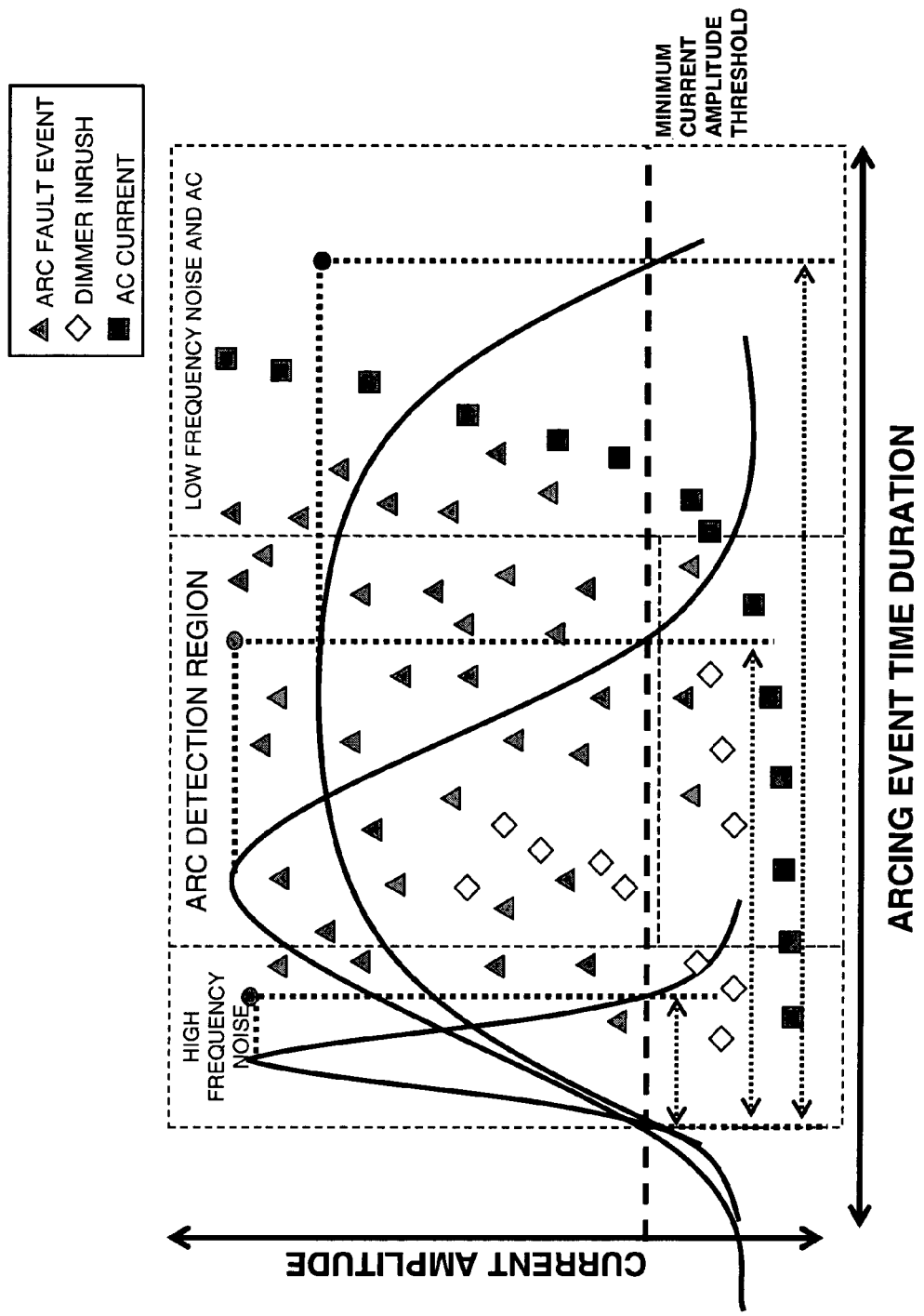
FIG. 2 is plot showing an exemplary Amplitude-Duration relationship for both arcing and non-arcing conditions.

FIG. 2 is plot showing an exemplary Amplitude-Duration relationship for both arcing and non-arcing conditions. In a first zone, which can be characterized by relatively short duration events, the events can be recognized, discriminated and/or treated as likely representing high frequency noise. In a second, intermediate arc detection zone, those events having at least a predetermined minimum current amplitude can be recognized and/or as likely representing either an arc fault condition or in-rush condition. In a third zone, which can be characterized by relatively long duration events, the events can be recognized, discriminated and/or treated as likely representing low-frequency noise and/or AC current.

Figure 3:
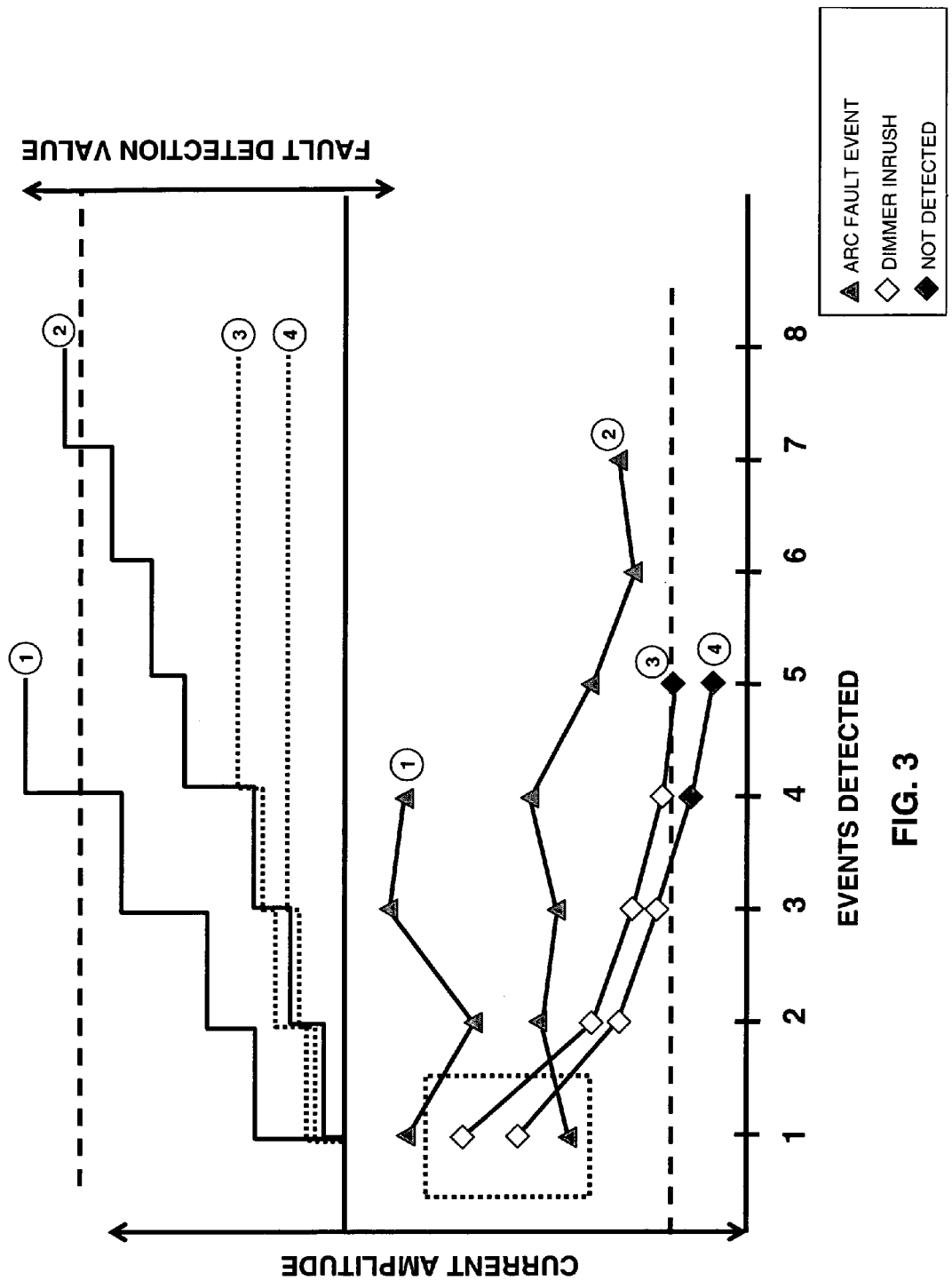
FIG. 3 is a plot showing the results of an exemplary event score accumulation method.

FIG. 3 is a plot showing the results of an exemplary event score assessment method. As shown in the lower plot, for those events falling above the predetermined minimum current amplitude of FIG. 2, and/or falling within the arc detection zone of FIG. 2, each event can receive a score corresponding to its peak amplitude. As shown in the upper plot, the scores of related events can be summed, and if that sum rises above a predetermined level (shown as a dashed line in the upper plot), the related events can be recognized, discriminated and/or treated as likely representing an arc fault condition. Conversely, certain related events, such as those related to a high frequency condition, an in-rush condition, and/or a low-frequency condition, can be treated as a non-arcing condition.

Figure 4:
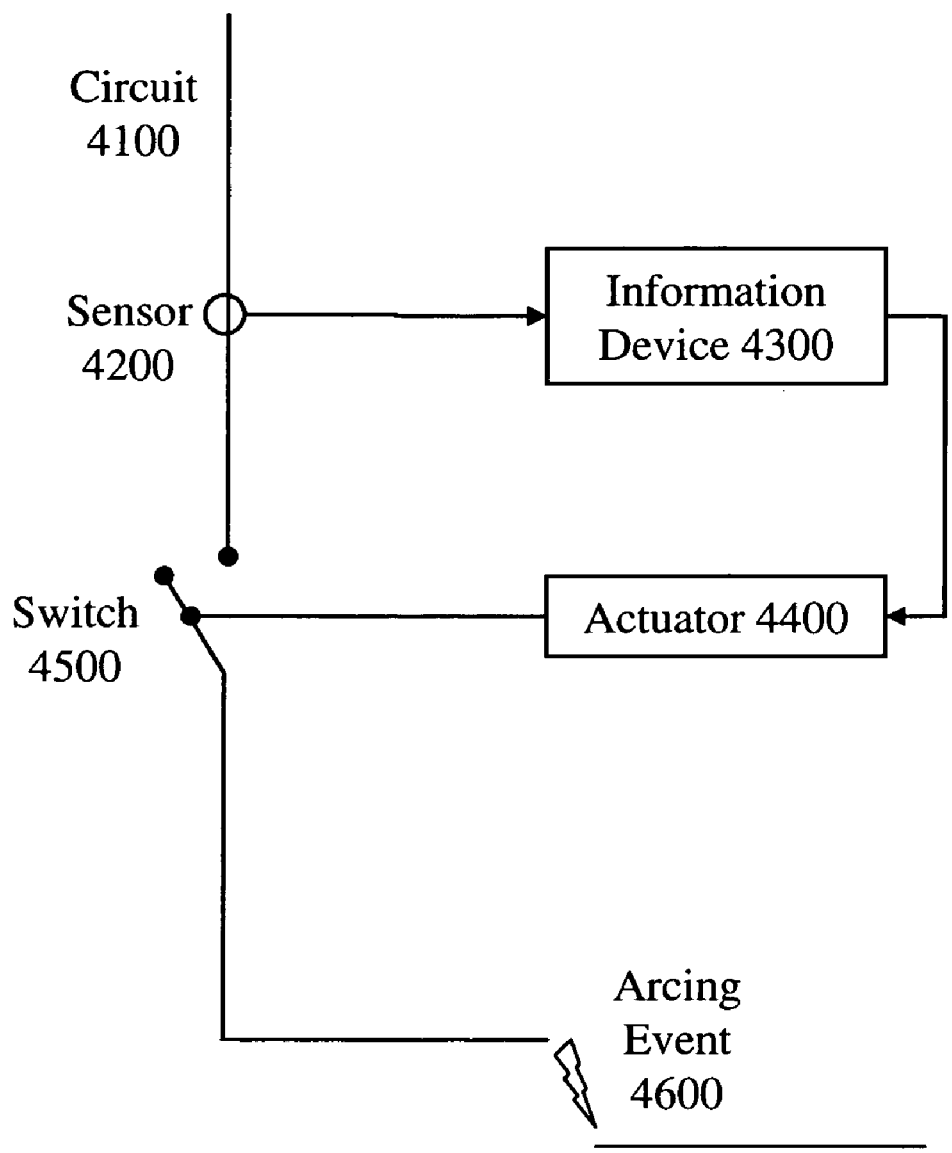
FIG. 4 is a block diagram of an exemplary embodiment of a system 4000.

FIG. 4 is a block diagram of an exemplary embodiment of a system 4000, which can comprise a circuit 4100, an alternating current through which can be sensed and/or detected by sensor 4200. A signal from sensor 4200 can be provided to information device 4300 for processing. Prior to and/or at information device 4300, the signal can be digitized and/or sampled. At information device 4300, the resulting digital data can be analyzed to identify, for example, one or more amplitude-duration pairs, which can be compared to predetermined criteria to determine whether to score the pair and/or the event it represents. A cumulative and/or group score can be determined and/or assessed for a plurality of related data, such as data representative of a plurality of events and/or a condition. The assessment can result in a determination and/or discrimination of a type of condition associated with the plurality of related data, amplitude-duration pairs, and/or events. Based on a signal generated by information device 4300, such as in response to a determination and/or detection of an arcing event 4600 and/or an arcing condition, and/or detection of a hazardous arcing condition, an actuator 4400 can cause a switch 4500 to interrupt circuit 4100. Switch 4500 can be a circuit breaker, such as an AFCI.

Figure 5:
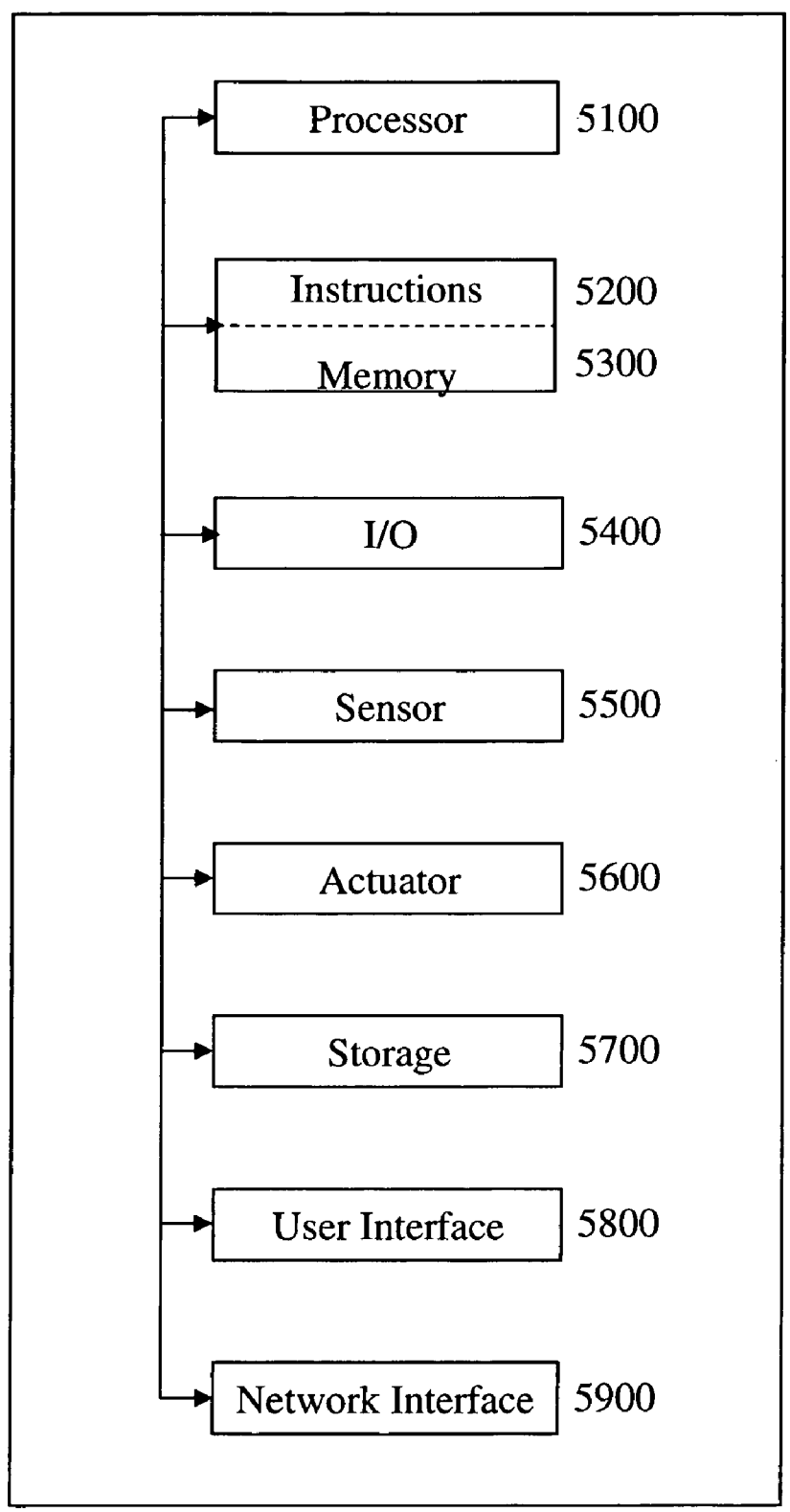
FIG. 5 is a block diagram of an exemplary embodiment of an information device 5000.

FIG. 5 is a block diagram of an exemplary embodiment of an information device 5000, which in certain operative embodiments can comprise, for example, information device 4300 of FIG. 4. Information device 5000 can comprise and/or be coupled to any of numerous well-known components, such as for example, one or more processors 5100, one or more instructions 5200 stored in one or more memories 5300, one or more input/output (I/O) devices 5400, one or more sensors 5500, one or more actuators 5600, one or more storage devices 5700, one or more user interfaces 5800, and/or network interfaces 5900, etc.

In certain exemplary embodiments, detection of an arcing condition can result in a notification of that fact being presented via a graphical user interface 5800. Information related to signals, amplitude-duration pairs, arcing and/or non-arcing events and/or conditions, and/or responses thereto, etc., can be logged, archived, and/or analyzed to, for example, avoid hazards, determine causes, spot patterns, detect trends, and/or perform predictive and/or preventive maintenance, etc.

Figure 6:
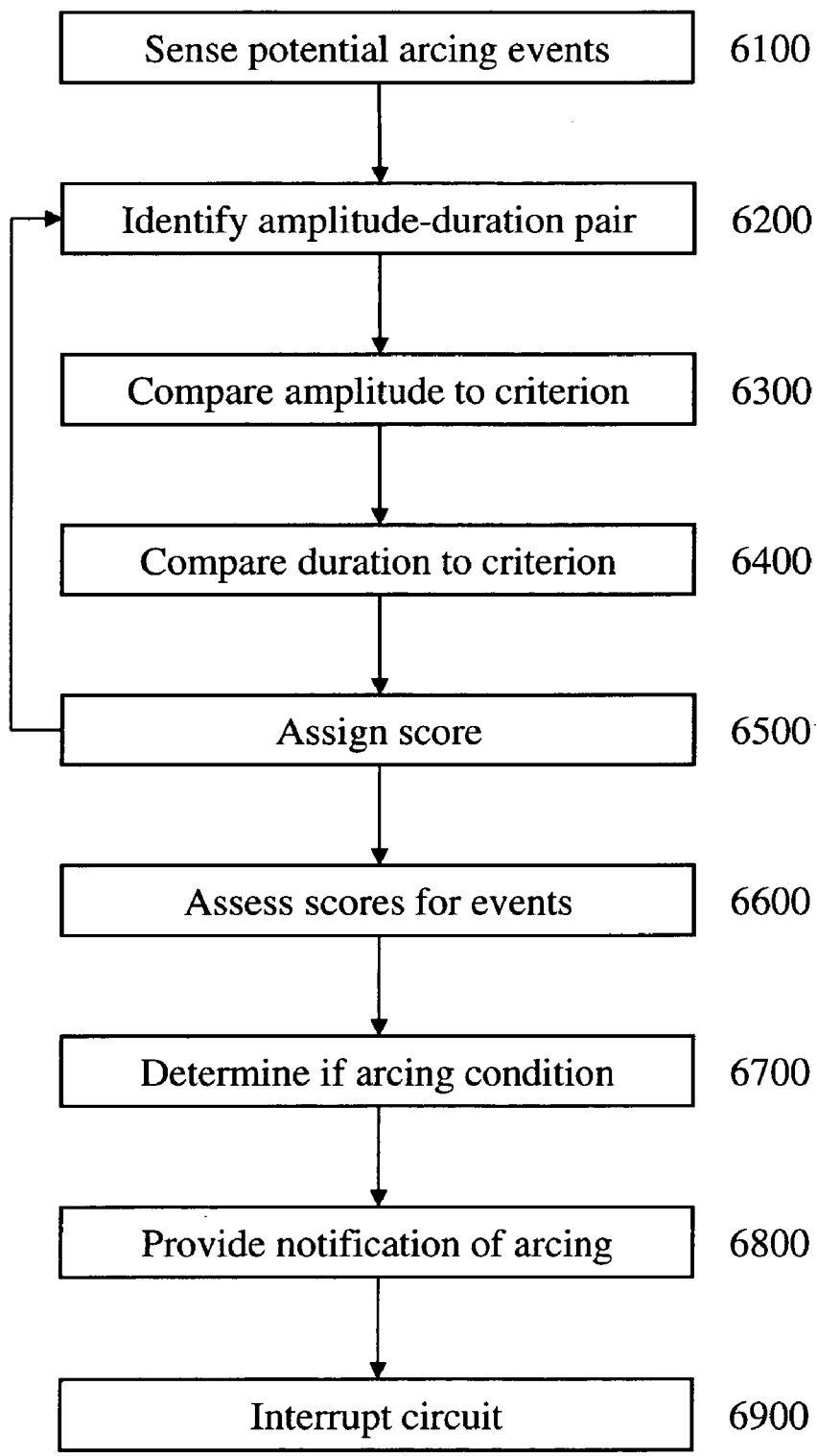
FIG. 6 is a flowchart of an exemplary embodiment of a method 6000.

FIG. 6 is a flowchart of an exemplary embodiment of a method 6000. At activity 6100, a plurality of potential arcing events associated with an alternating current circuit can be sensed. At activity 6200, for each potential arcing event, an amplitude-duration pair an be identified. At activity 6300, for each potential arcing event and/or amplitude-duration pair, the amplitude can be compared to a predetermined amplitude criterion. At activity 6400, for each potential arcing event and/or amplitude-duration pair, the duration can be compared to a predetermined duration criterion. At activity 6500, for each potential arcing event and/or amplitude-duration pair, a score can be assigned.

At activity 6600, for the plurality of potential arcing events, the scores can be assessed. At activity 6700, based on the assessed scores, a determination can be made whether an arcing condition and/or a non-arcing condition is present. At activity 6800, if an arcing condition is present, a notification can be provided regarding the arcing condition. At activity 6900, if an arcing condition is present, the circuit can be interrupted. At any activity, data can be stored and/or transmitted.

Figure 7A:
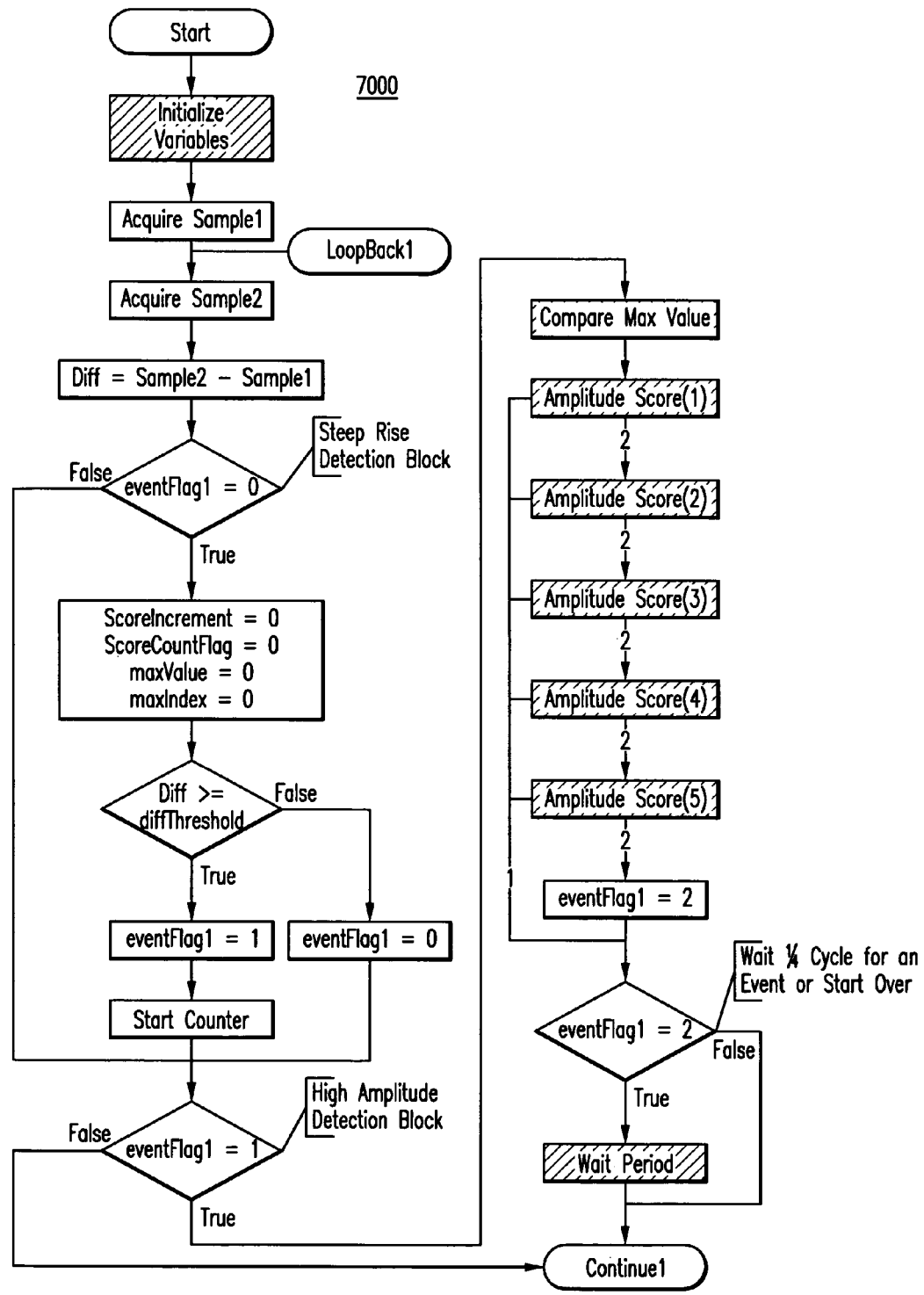
FIG. 7 is a flowchart of an exemplary embodiment of a method 7000.
Figure 7B:
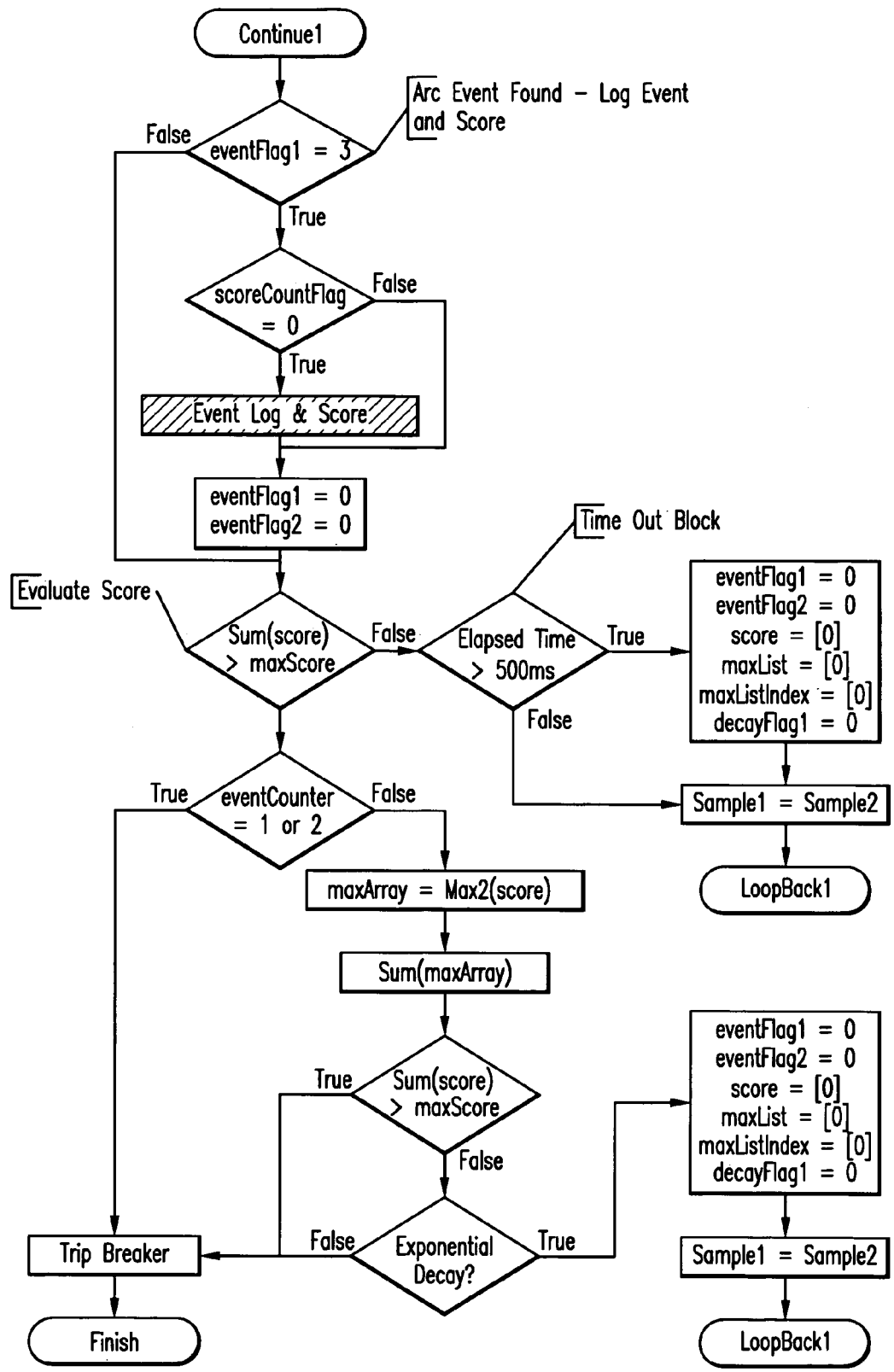

FIG. 7 is a flowchart of an exemplary embodiment of a method 7000 for determining an arcing condition and/or opening a circuit breaker in response to an arcing condition.

Figure 8A:
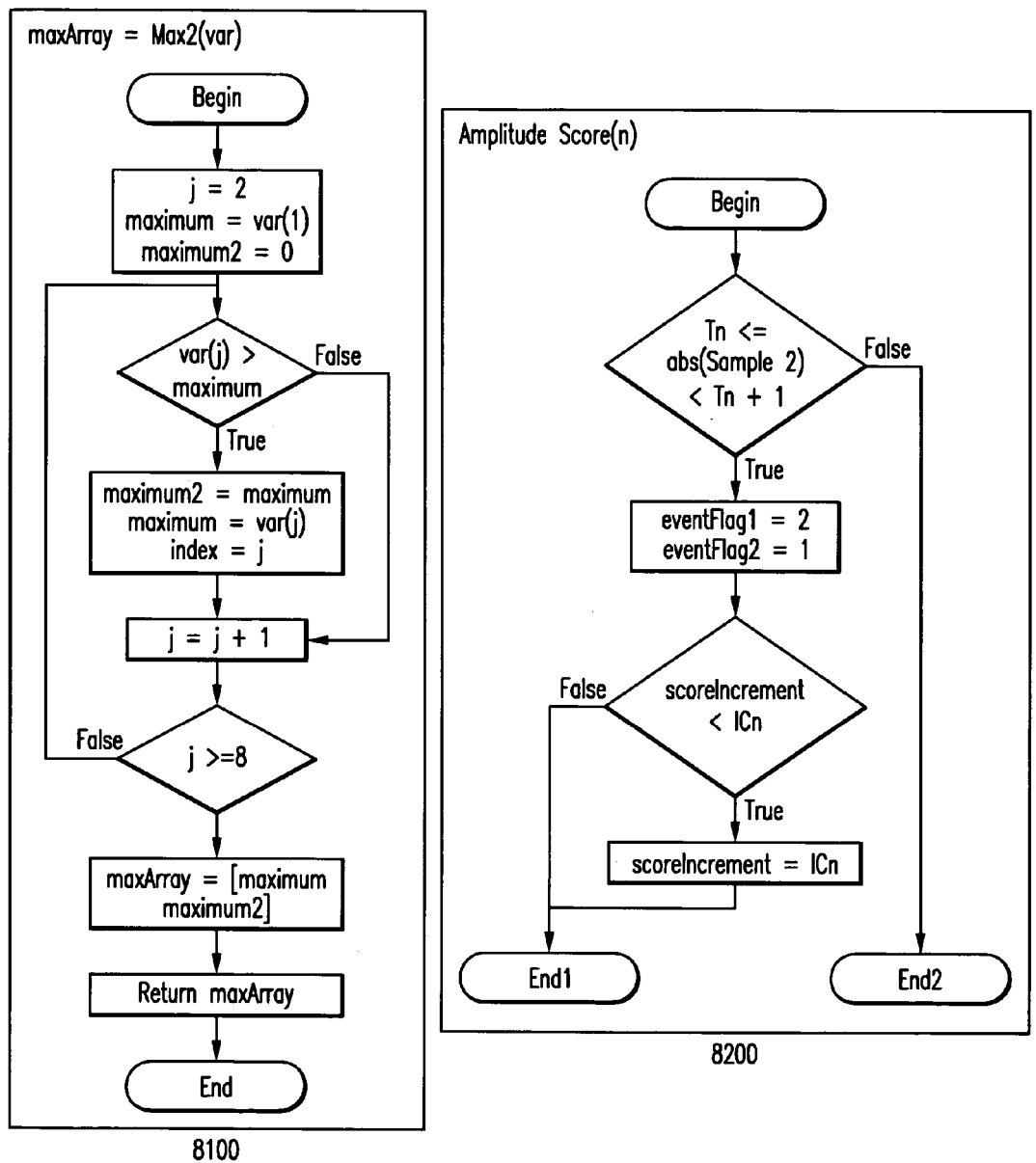
FIG. 8 is a collection of flowcharts of an exemplary embodiment of several method and/or subroutines.
Figure 8B:
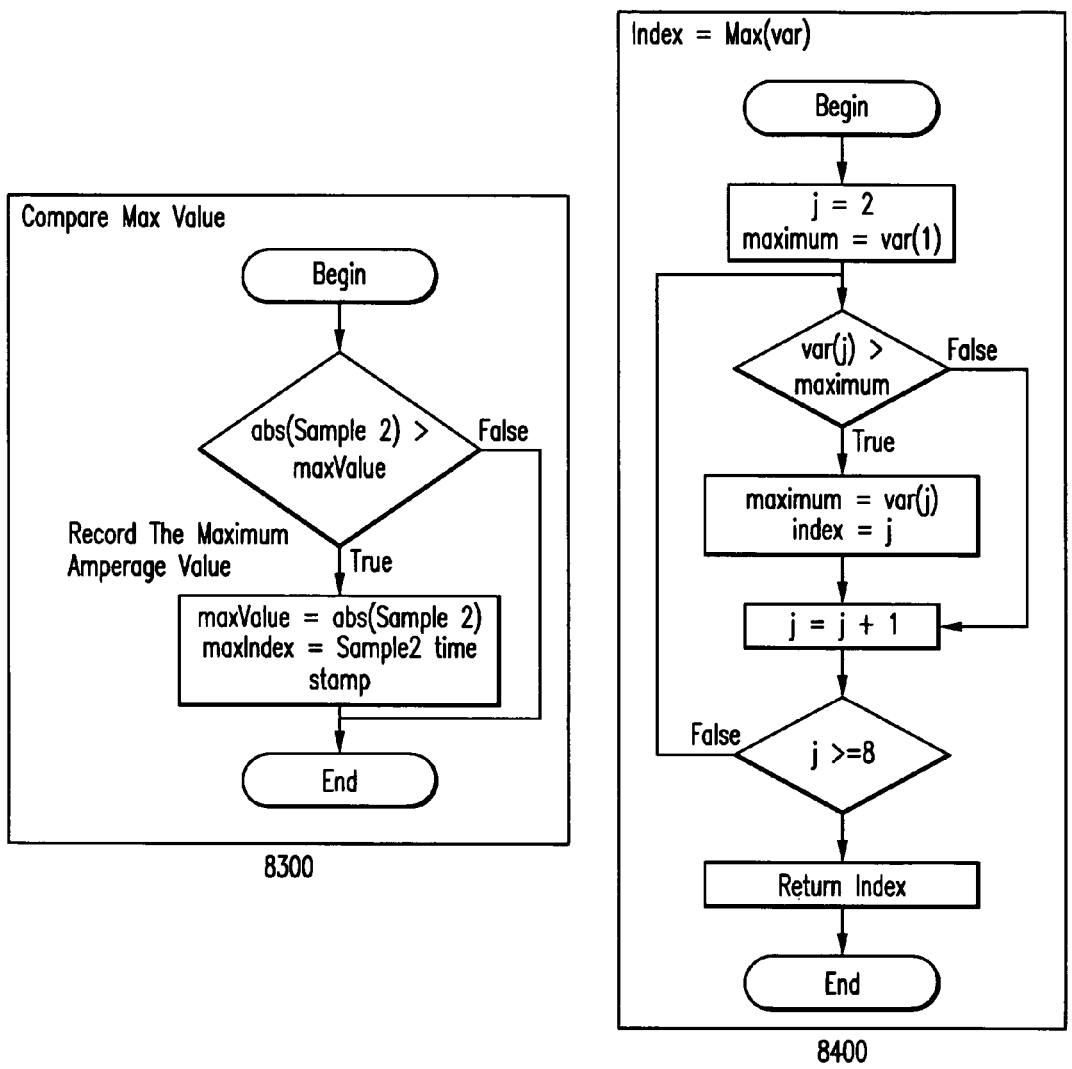
Figure 8C:
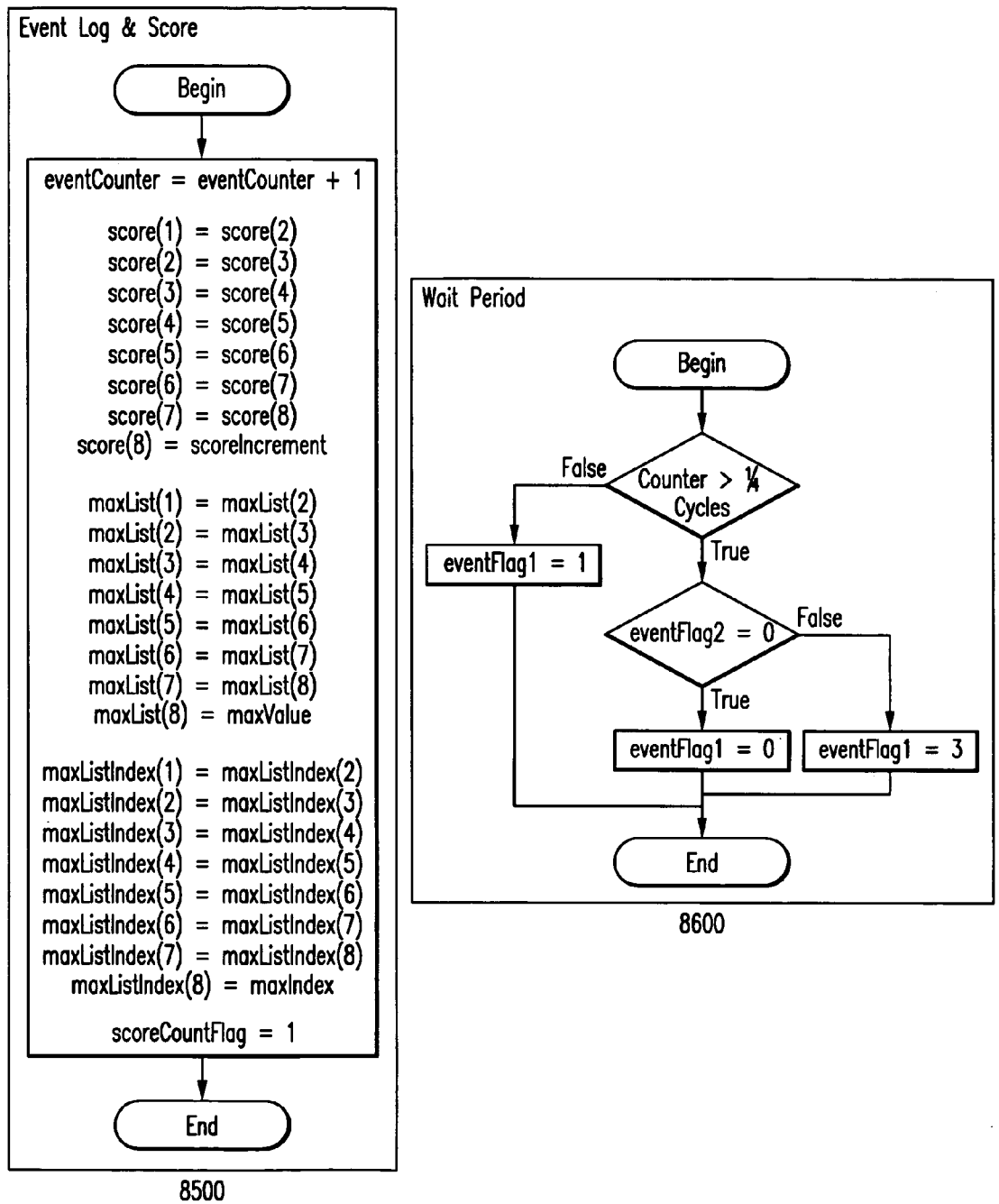

FIG. 8 is a collection of flowcharts of an exemplary embodiment of several methods and/or subroutines 8100, 8200, 8300, 8400, 8500, 8600 that can be associated with method 7000 of FIG. 7.

Figure 9A:
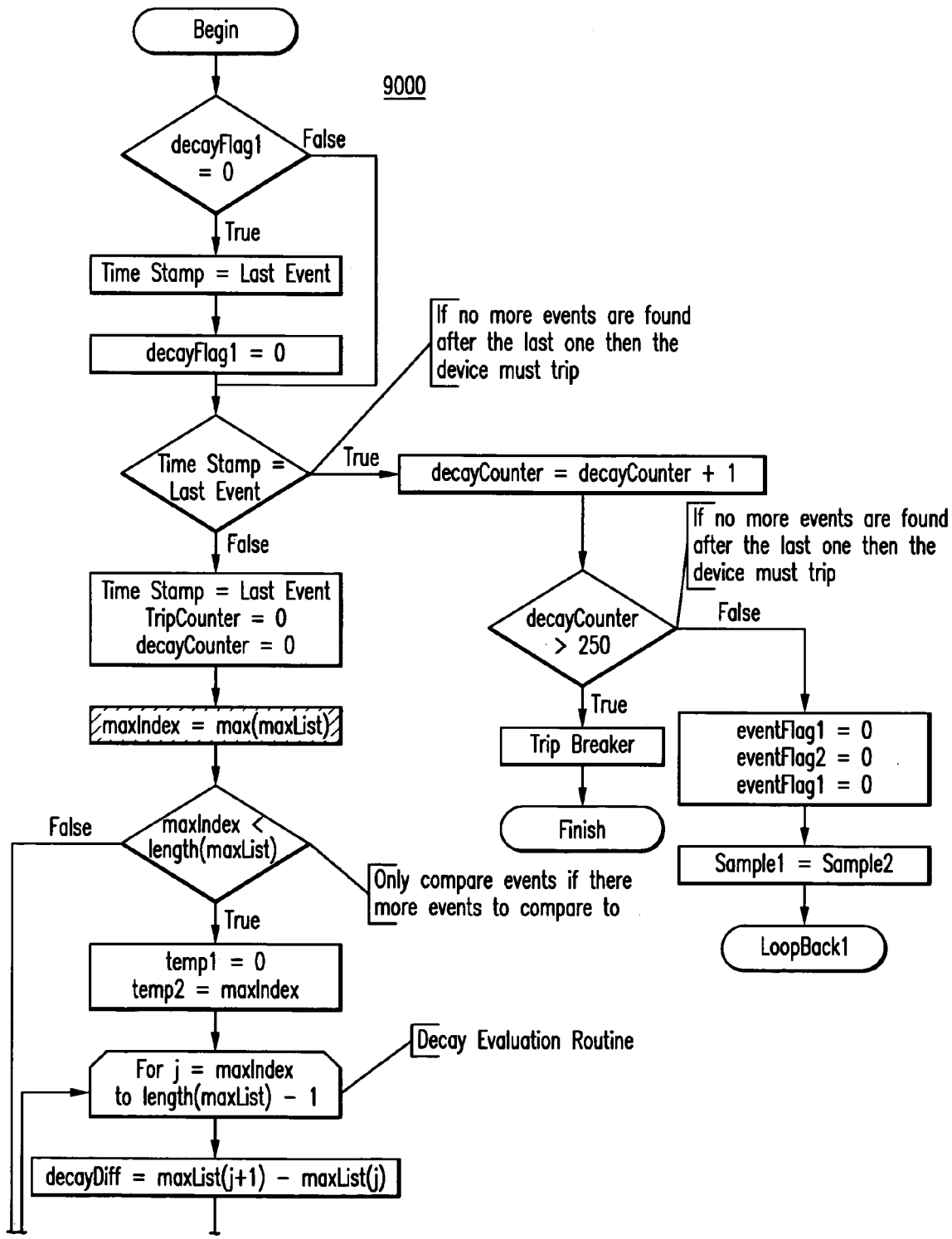
FIG. 9 is a flowchart of an exemplary embodiment of a method 9000.
Figure 9B:
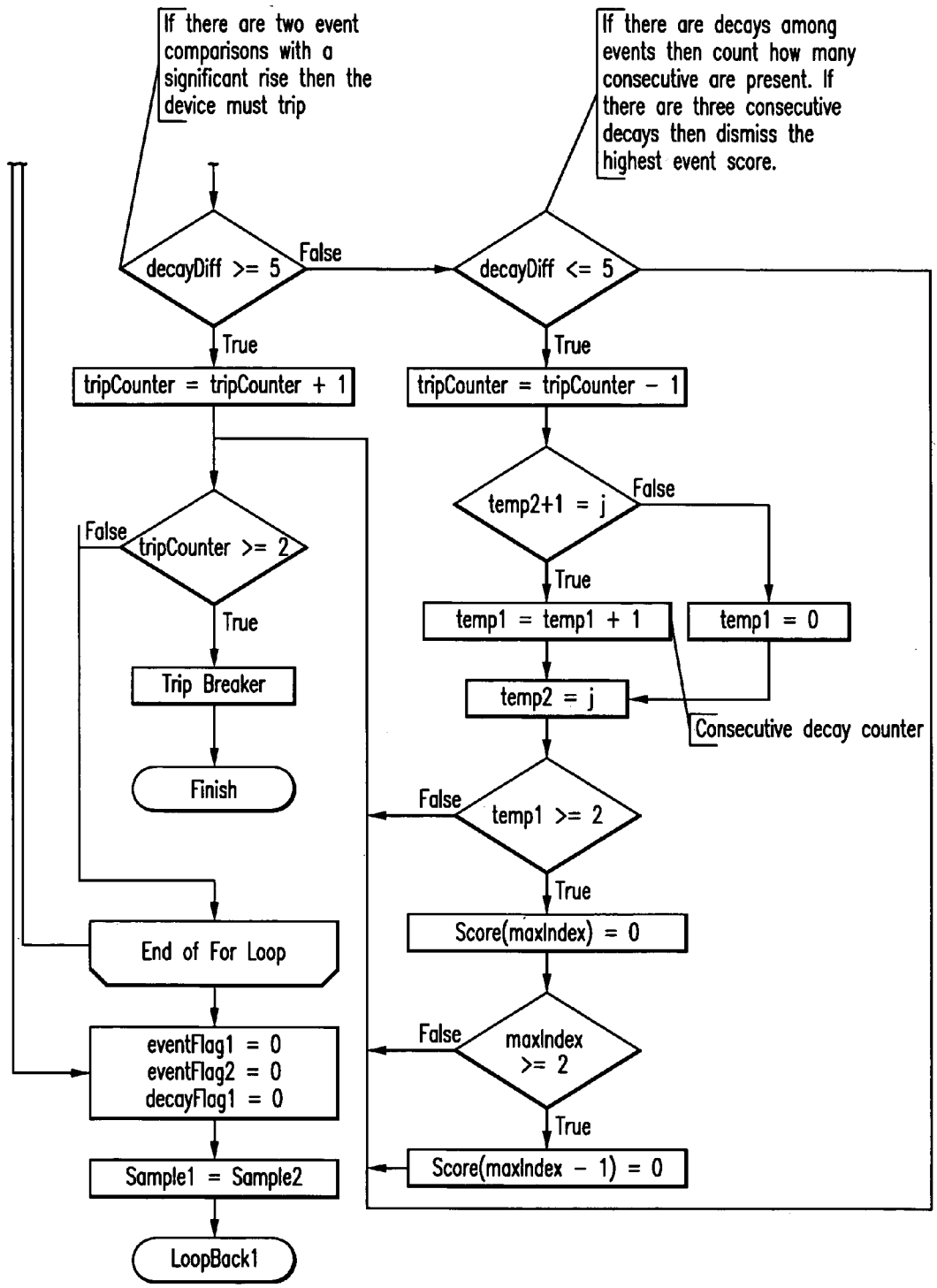

FIG. 9 is a flowchart of an exemplary embodiment of a method 9000 for determining an arcing condition and/or opening a circuit breaker in response to an arcing condition.

Still other embodiments will become readily apparent to those skilled in this art from reading the above-recited detailed description and drawings of certain exemplary embodiments. It should be understood that numerous variations, modifications, and additional embodiments are possible, and accordingly, all such variations, modifications, and embodiments are to be regarded as being within the spirit and scope of this application. For example, regardless of the content of any portion (e.g., title, field, background, summary, abstract, drawing figure, etc.) of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated. Further, any activity or element can be excluded, the sequence of activities can vary, and/or the interrelationship of elements can vary. Accordingly, the descriptions and drawings are to be regarded as illustrative in nature, and not as restrictive. Moreover, when any number or range is described herein, unless clearly stated otherwise, that number or range is approximate. When any range is described herein, unless clearly stated otherwise, that range includes all values therein and all subranges therein. Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such incorporated by reference material is specifically not incorporated by reference herein.

What is claimed is:

1. A method, comprising a plurality of activities, comprising:
    for each of a plurality of potential arcing events associated with an alternating current:
        sensing the potential arcing event;
        identifying an amplitude-duration pair associated with the potential arcing event;
        for an amplitude-duration pair that fulfills a predetermined amplitude criterion and an associated predetermined duration criterion, assigning a score, the score one of a plurality of predetermined scores, each of the plurality of predetermined scores associated with an amplitude range of a plurality of amplitude ranges, the score selected based upon a determined range of the amplitude comprised by the amplitude duration pair;
    assessing the scores for the plurality of amplitude-duration pairs; and
    based on said assessed scores, determining if the plurality of potential arcing events corresponds to an arcing condition.

2. The method of claim 1, further comprising:
digitizing a signal representing the alternating current.

3. The method of claim 1, further comprising:
acquiring a sample associated with the alternating current.

4. The method of claim 1, further comprising:
determining an amplitude corresponding to the amplitude-duration pair.

5. The method of claim 1, further comprising:
determining a duration corresponding to the amplitude-duration pair.

6. The method of claim 1, further comprising:
summing the plurality of selected scores.

7. The method of claim 1, further comprising:
analyzing a decay of an amplitude associated with a potential arcing event.

8. The method of claim 1, further comprising:
discriminating an arcing condition.

9. The method of claim 1, further comprising:
discriminating a non-arcing condition.

10. The method of claim 1, further comprising:
determining if an arcing condition is hazardous.

11. The method of claim 1, further comprising:
treating a high frequency condition as a non-arcing condition.

12. The method of claim 1, further comprising:
treating an in-rush condition as a non-arcing conditions.

13. The method of claim 1, further comprising:
storing information associated with each of the plurality of potential arcing events.

14. The method of claim 1, further comprising:
storing information associated with the arcing condition.

15. The method of claim 1, further comprising:
providing a notification regarding the arcing condition.

16. The method of claim 1, further comprising:
interrupting a circuit.

17. The method of claim 1, wherein:
the score is based upon a peak amplitude of the potential arcing event.

18. The method of claim 1, wherein:
the potential arcing event begins when an amplitude of the alternating current exceeds a first predetermined amplitude.

19. The method of claim 1, wherein:
the potential arcing event ends when an amplitude the alternating current exceeds a second predetermined amplitude.

20. A machine-readable medium comprising a plurality of instructions for activities comprising:
    for each of a plurality of potential arcing events associated with an alternating current:
        sensing the potential arcing event;
        identifying an amplitude-duration pair associated with the potential arcing event;
        for an amplitude-duration pair that fulfills a predetermined amplitude criterion and an associated predetermined duration criterion, assigning a score, the score one of a plurality of predetermined scores, each of the plurality of predetermined scores associated with an amplitude range of a plurality of amplitude ranges, the score selected based upon a determined range of the amplitude comprised by the amplitude duration pair;
    assessing the scores for the plurality of amplitude-duration pairs; and
    based on said assessed scores, determining if the plurality of potential arcing events corresponds to an arcing condition.

21. A system comprising:
a sensor adapted to sense each potential arcing event of a plurality of potential arcing events associated with an alternating current; and a processor adapted to:
  identify an amplitude-duration pair associated with the potential arcing event;
  for an amplitude-duration pair that fulfills a predetermined amplitude criterion and an associated predetermined duration criterion, assign a score, the score one of a plurality of predetermined scores, each of the plurality of predetermined scores associated with an amplitude range of a plurality of amplitude ranges, the score selected based upon a determined range of the amplitude comprised by the amplitude duration pair;
  assess the scores for the plurality of amplitude-duration pairs;
  based on said assessed scores, determine that the plurality of potential arcing events corresponds to an arcing condition; and
  cause a circuit to be interrupted.

22. The method of claim 21, further comprising a circuit breaker adapted to open a circuit in response to receiving a predetermined signal from said processor.

* * * * *